United States Patent Office 2,696,114
Patented Dec. 7, 1954

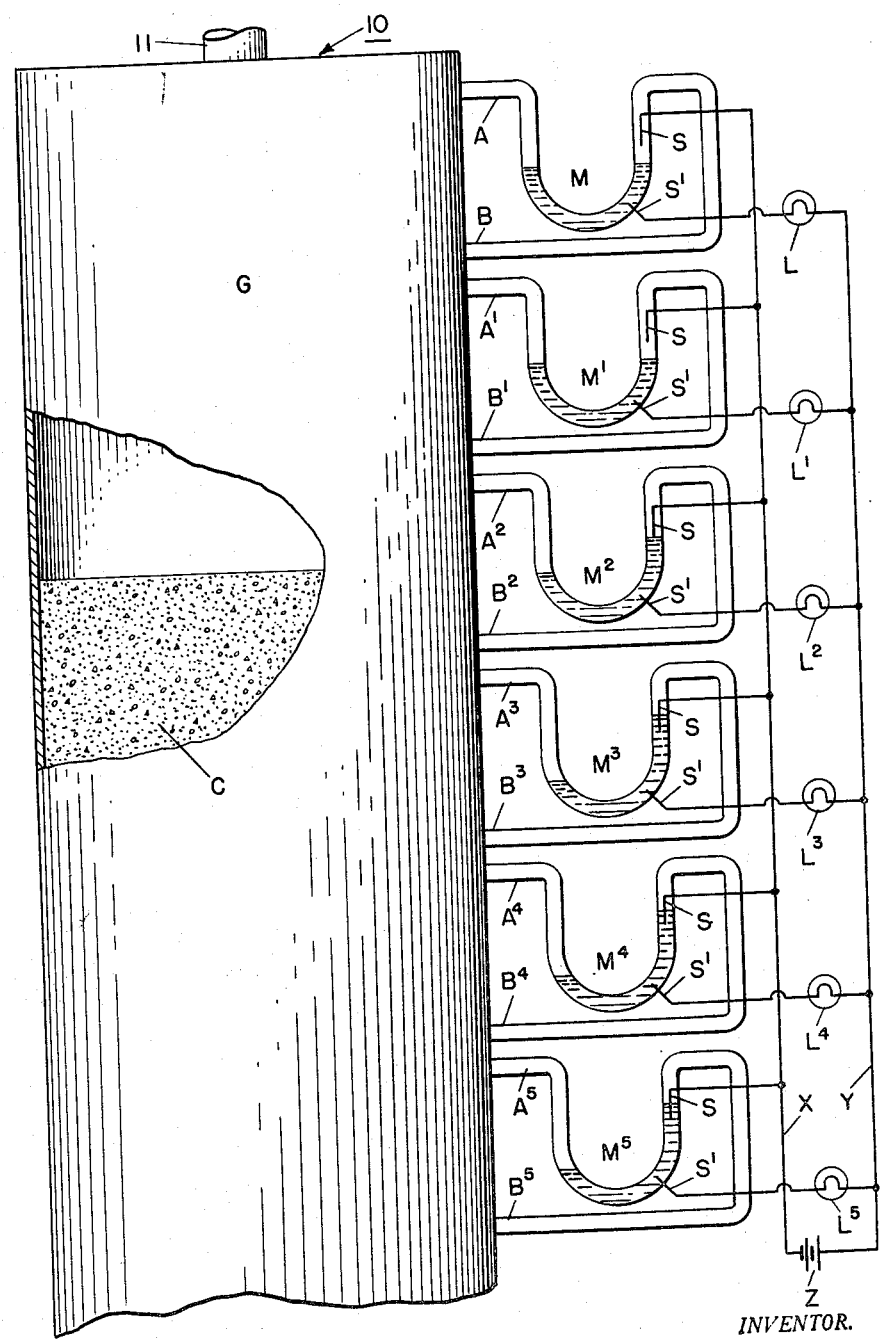

2,696,114

LEVEL INDICATOR FOR GRANULAR SOLIDS

Leland W. T. Cummings, Wyncote, Pa., assignor to Sun Oil Company, Philadelphia, Pa., a corporation of New Jersey Application April 28, 1950, Serial No. 158,846

3 Claims. (Cl. 73—299)

This invention relates to level determination of material in a vertical disposed vessel wherein the vessel is adapted to have supplied thereto at its upper end a dry material in powdered or granular form. The invention has particular application to vessels used in contacting operations wherein dry material moves by gravity in continuous flow through the vessel but also has application to the level determination of dry material in a reaction vessel wherein a static bed type of operation is carried out.

In particular the invention contemplates combining with a vertically disposed vessel a plurality of pressure differential indicating or transmitting instruments, such as manometers, for determining the level of material in the vessel which is supplied to the vessel adjacent its upper end for passage thereinto or therethrough.

In the static bed type of contacting operations wherein reaction vessels of substantial heights are used, the invention finds utility since the predetermined level of the contact material desired in the vessel can be ascertained without the necessity of visual or other direct inspection of the material in the vessel.

The invention finds its greatest utility, however, in connection with various types of contacting operations wherein a plurality of reaction vessels are placed in communication and the contact material moves by gravity through the reaction vessels continuously. In these operations one type of reaction is effected in one vessel, for example, an on-stream reaction to obtain a desired product, while a regeneration reaction to remove contaminants from the contact material is simultaneously effected in another vessel. In such moving contact material operations the original volume of granular or powdered material supplied to the unit becomes reduced due to attrition and other factors and it is necessary to replenish the volume lost in order to maintain predetermined or desired levels in the reaction vessels in order to carry out efficiently the concomitant "on stream" and "regeneration" reactions. In the moving catalyst type of operation, ordinarily an on-stream reaction to obtain the desired product would be effected in the upper vessel while in the lower vessel a regeneration operation would be carried out to remove from the contact or granular material any contaminants formed in the upper vessel during the on-stream reaction operation, following the regeneration reaction the contact material is then delivered to the upper reaction vessel to repeat the cycle of operation.

In order to properly carry out these concomitant operations, the conditions of the reactions such as supplying reactants, removal of reaction products and maintenance of contact material within the vessels must be substantially constant. Hence it is essential to know at all times that the proper amount of contact material is maintained within both reaction chambers and it is thus necessary to determine or check the level, at least periodically, of contact material in the vessels.

Various means have heretofore been used for indicating level of a moving body of contact material in reaction vessels, one such means being the use of mechanical floats which are actuated by the moving mass of material.

The present invention is based on the idea that the pressure drop through a vessel varies between an empty section of the vessel and a section of the vessel which contains contact material. It is a recognized fact that the pressure drop through the empty space in a vessel is very small while the pressure drop in the section containing contact material or the packed section of the vessel may be upwardly of 10,000 times as great, depending on the nature of the material, as the pressure drop through the empty section of the vessel.

Specifically the present invention is directed to the utilization of a series of pressure differential indicating or transmitting instruments, such as manometers, which are spaced vertically of the vessel and located in such a manner that one is positioned adjacent the top of the vessel and one at the lower end of the vessel with other manometers preferably equally spaced therebetween and wherein each manometer has its pressure cap extending through the vessel wall to be in communication with the interior of the vessel. With such an arrangement, the fluid, for example mercury, in the manometers which are in communication with the air space will extend upwardly in each of the manometer's legs to substantially the same height or level, due to the small pressure drop, while the manometers which are in communication with the portion of the vessel containing the contact material, due to the greater pressure drop, will show a difference in the level of the liquid in the manometer legs.

This pressure differential can be utilized to transmit signals from the manometers to a central point, such as the instrument or control room, to indicate the level of the contact material in a vessel. Various means of transmission can be utilized. For example each manometer can be electrically connected through a mercury switch to a light located in the control room and each light arranged to indicate by its color the approximate height of the material in the vessel. Of course other pressure transmitting means known in the instrumentation art can be utilized to actuate the signals.

Referring to the single figure of the drawing, the numeral 10 indicates a vessel into which contact material is supplied through inlet 11. For the purpose of explaining the invention, the vessel 10 should be considered to represent diagrammatically either a reaction vessel having a closed lower end in which a static bed of contact material is maintained or to represent a reaction vessel of a moving catalyst unit to which the contact material is supplied at inlet 11 for movement by gravity continuously through the vessel. The contact material is indicated at C and is disposed generally in the lower half of the vessel 10 while the air or gas space G exists in the upper portion of the vessel.

At the right of the figure are shown a series of differential pressure measuring devices in the form of manometers M comprising U tubes containing a body of transmitting fluid such as mercury, and the legs of the U tubes terminate in upper and lower end portions. The manometers are indicated as M, $M^1$, $M^2$, $M^3$, $M^4$, and $M^5$, having one leg of the U tube terminating in upper end portions respectively A, $A^1$, $A^2$, $A^3$, $A^4$, and $A^5$, which are in communication with the vessel 10 at spaced points vertically of the vessel and the other leg of the U tube terminating in lower end portions B, $B^1$, $B^2$, $B^3$, $B^4$, and $B^5$, which are also in communication with the vessel 10 but spaced vertically below the upper end portions. With no gaseous flow the mercury in each of the manometers will be positioned at the same height in both legs of the U tubes, but when gas is flowing through the vessel 10 the height of the mercury in the legs will vary slightly.

From an inspection of the drawing, it will be seen that the mercury in the manometers M and $M^1$ which have both legs in communication with the air or gas space A is at substantially the same height in each leg indicating that the pressure drop across this zone of the vessel is so insignificant as to have practically no effect on the normal level of the mercury in the manometer legs.

The mercury in manometer $M^2$ which has its upper end portion in communication with the air space and its lower end portion in communication with the zone of contact material is partially displaced from one leg and is raised to a higher level in the other leg of the U tube.

The mercury in manometers $M^3$, $M^4$, and $M^5$, which have both the upper and lower end portion in communication with the vessel in the zone containing the contact material C is further displaced in one of the legs and raised in the other legs of the U tubes to a much higher level. This is due to the greatly increased pressure drop through the vessel in the zone C of contact material.

In order to utilize the pressure conditions existing in the respective zones of the vessel 10 to generally indicate the level of the contact material in the vessel, a source of current is provided, for example, a battery Z having power lines X and Y leading therefrom to be placed in circuit with the manometers. One means of placing the batteries in circuit with the manometers is to utilize a pressure switch having contacts S and S', the latter being connected with the power line Y and positioned to be constantly disposed in the body of mercury in each manometer while the contacts S of each switch is in circuit with battery B through line X and positioned in a leg of the U tube to be contacted with the mercury as it rises in accordance with the increased pressure drop through the body of contact material.

In order to indicate at a remote point the pressure differential existing within a vessel, for example, to indicate at a central point such as a control room or instrument room, signals such as lights, may be placed in circuit with the pressure switches which are energized when the height of the transmitting liquid is raised sufficiently to make contact with the contacts S of the pressure switches. In the figure, a series of various colored lights are in circuit with the pressure switches, for example, the upper light L could be white and the bottom light $L^5$ red, to indicate that the upper and lower limits of level of the contact material has been reached. Various other colored lights, such as those indicated as $L^1$ for green, $L^2$ for yellow, $L^3$ for blue, and $L^4$ for purple, to indicate levels attained between the upper and lower ends of the vessel 10 may be used.

From a further inspection of the drawings, it will be seen that the mercury in the legs of U tube of manometers M and $M^1$ is substantially the same level and that the mercury does not make contact with the contacts S of the pressure switches associated with these manometers and hence the lights L and $L^1$ will not be energized which will indicate to the operator that the level of the catalyst is below that lower leg $B^1$ of manometer $M^1$. The height of the mercury in the U tube of manometer $M^2$ is raised in one leg to make contact with contact S of its pressure switch and the light $L^2$ will be energized. This will indicate that the level of the contact material is somewhere between the upper end portion $A^2$ and lower end portion $B^2$ of this manometer. Since the pressure drop across the zone of the vessel containing the contact material C is great, the transmitting liquid or mercury will be raised in one leg of the U tubes of manometers $M^3$, $M^4$ and $M^5$, and contact will be made with the switches S and the lights $L^3$, $L^4$, and $L^5$ will all be energized.

With this arrangement for indicating the pressure in the vessels 10, visually, it will be seen that when the vessel is used for a static bed operation that the material can be supplied to the vessel 10 until the lights indicate when a predetermined level is reached and the supply of material then stopped. When the vessel 10 is adapted for a moving body of contact material the desired level can be determined through the lighting arrangement and when the volume of contact material in the vessel decreases below the level desired or to a level which would effect the proper operation of the vessel, more material could be supplied until the desired level is reached.

I claim:

1. Means for determining the level of granular contact material providing a porous mass contained in a vessel wherein fluid is flowing through said mass, said means comprising a series of pressure differential measuring devices spaced vertically between the upper and lower ends of the vessel, each of such devices communicating with the interior of the vessel at two substantially closely spaced apart levels and responsive to differential pressures of the fluid flowing within the vessel at such spaced apart levels and thus effective, when the granular contact material level is between closely spaced apart levels communicating with one of said devices, to render such device operative to register the differential pressure.

2. Means for determining the level of granular contact material providing a porous mass contained in a vessel wherein fluid is flowing through said mass, said means comprising a number of pressure differential measuring devices spaced vertically between the upper and lower ends of the vessel, each of such devices communicating with the interior of the vessel at two substantially closely spaced apart levels and responsive to differential pressures of the fluid flowing within the vessel at such spaced apart levels and thus effective, when the granular contact material level is between closely spaced apart levels communicating with any of said devices, to operate such device to register differential pressure, the uppermost of said devices, communicating respectively with a lower space containing such material and an upper space free of such material, being adapted to register the solids level between said spaces.

3. The means defined in claim 2 in combination with electric circuits connected with the respective devices and adapted to be closed and opened, dependent upon rise and fall of the level of solids, and signalling devices connected with the respective electric circuits.

References Cited in the file of this patent

UNITED STATES PATENTS

| Number | Name | Date |
|---|---|---|
| 2,232,840 | Claffey | Feb. 25, 1941 |
| 2,465,628 | Border | Mar. 29, 1949 |
| 2,521,477 | Pelletere | Sept. 25, 1950 |

FOREIGN PATENTS

| Number | Country | Date |
|---|---|---|
| 825,007 | France | Nov. 27, 1937 |
| 684,114 | Germany | Nov. 22, 1939 |